(12) United States Patent
Kurano et al.

(10) Patent No.: US 6,563,062 B2
(45) Date of Patent: May 13, 2003

(54) INSERTION/WITHDRAWAL MECHANISM FOR A CIRCUIT INTERRUPTER

(75) Inventors: Kouiti Kurano, Tokyo (JP); Hidenobu Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/849,603

(22) Filed: May 7, 2001

(65) Prior Publication Data

US 2002/0005339 A1 Jan. 17, 2002

(51) Int. Cl.⁷ .................................................. H01H 9/20
(52) U.S. Cl. ................. 200/50.24; 200/50.26; 200/308; 200/606
(58) Field of Search ................ 200/50.17, 50.21–50.26, 200/308; 361/605–609, 615–617, 619, 621

(56) References Cited

U.S. PATENT DOCUMENTS

| | | | | |
|---|---|---|---|---|
| 5,278,722 A | * | 1/1994 | Peruso | 200/50.24 |
| 5,495,388 A | * | 2/1996 | Bonetti et al. | 200/50.1 |
| 6,028,272 A | * | 2/2000 | Akers | 200/50.21 |
| 6,160,228 A | * | 12/2000 | Gerbert-Gaillard et al. | 200/50.21 |
| 6,229,106 B1 | * | 5/2001 | Robbins et al. | 200/318 |

FOREIGN PATENT DOCUMENTS

JP    6-68275    9/1994    .......... H01H/33/46

* cited by examiner

*Primary Examiner*—Michael Friedhofer
(74) *Attorney, Agent, or Firm*—Sughrue Mion, PLLC (57) ABSTRACT

A circuit interrupter insertion/withdrawal mechanism including an interrupter moving device including a drive shaft operable by an external operating handle from outside of the interrupter compartment, a lever connected between the drive shaft and the interrupter for driving the interrupter between the disconnected and connected positions, and a motion translating device connected between the drive shaft and the interrupter for translating a rotary motion of the drive shaft into a linear motion of the interrupter between the disconnected and connected positions. The lever is rotatable between a disconnecting position corresponding to the disconnected position of the interrupter and a connecting position corresponding to the connected position of the interrupter, the disconnected and connected positions being at substantially diametrically opposed positions about a center of rotation of the lever.

8 Claims, 11 Drawing Sheets

INSERTION/WITHDRAWAL MECHANISM FOR A CIRCUIT INTERRUPTER

CROSS REFERENCE TO RELATED APPLICATION

This application is based on Application No. 11-319864, filed in Japan on Nov. 10, 1999, the contents of which are hereby incorporated by reference.

BACKGROUND OF THE INVENTION

This invention relates to an insertion/withdrawal mechanism for a circuit interrupter mounted to a closed power distribution panel and, more particularly, to an insertion/withdrawal mechanism for a circuit interrupter including an interrupter mounted in an interrupter compartment and movable between a disconnected position and a connected position within the interrupter compartment.

Figure 16:
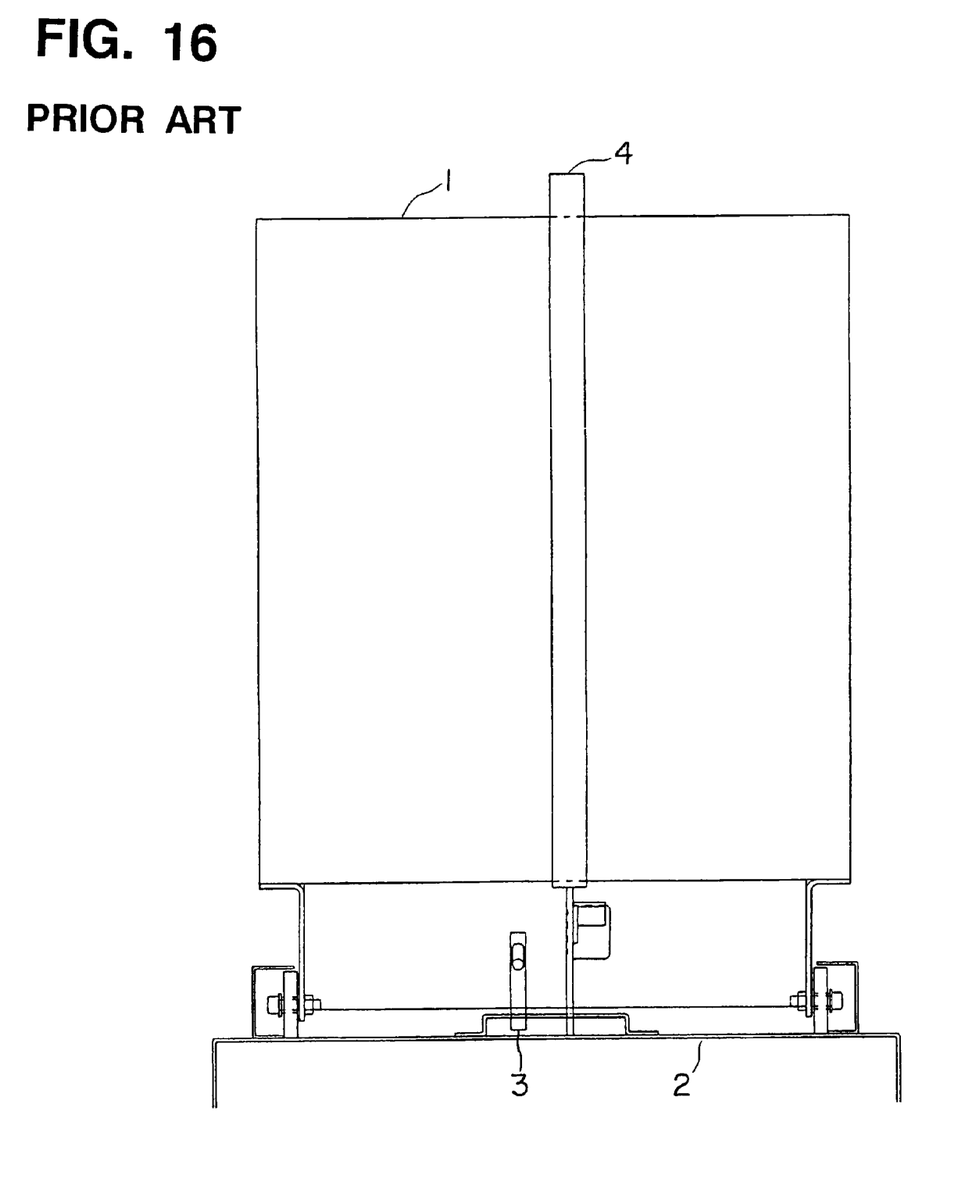
FIG. 16 is a front view of a conventional interrupter compartment of a closure-type distribution panel.
Figure 17:
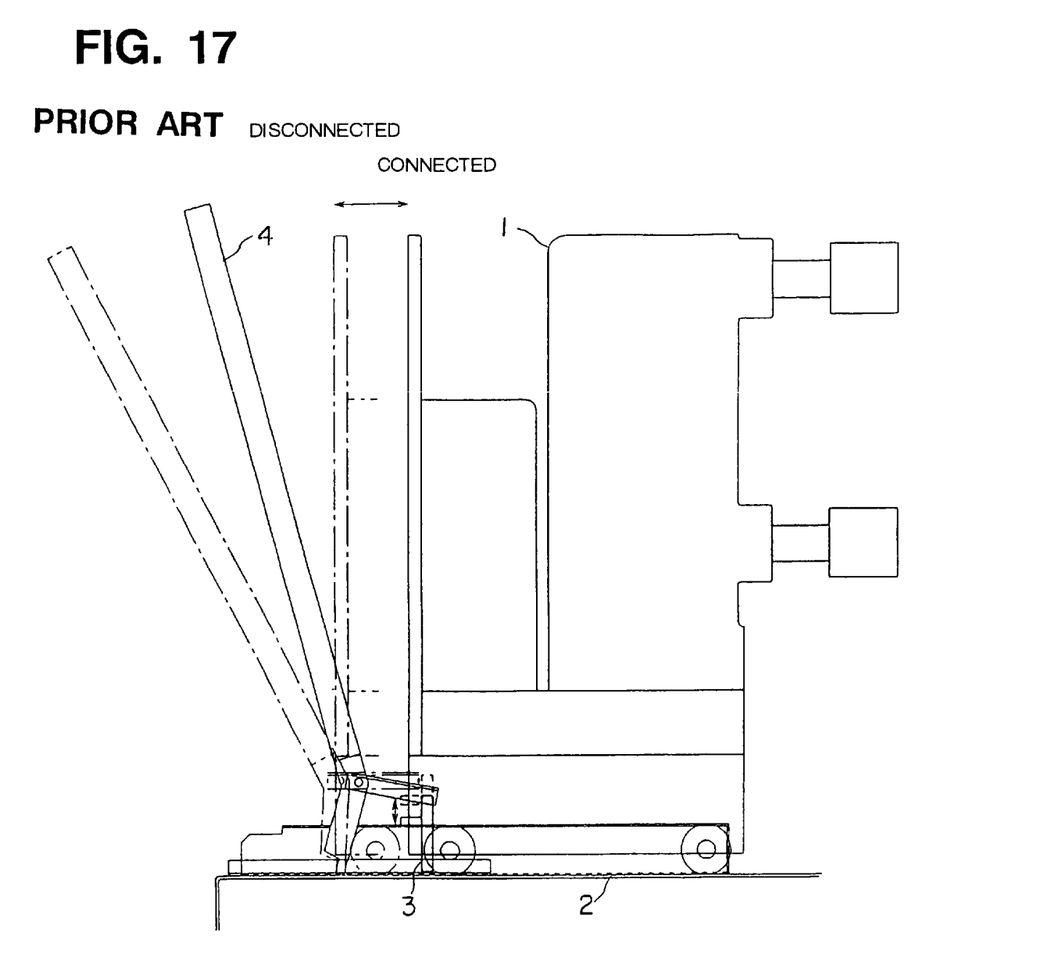
FIG. 17 is a side view of the interrupter compartment shown in FIG. 16.

FIGS. 16 and 17 illustrate a conventional insertion/withdrawal mechanism for a circuit interrupter, FIG. 16 being a front view of an interrupter compartment of a closure distribution panel and FIG. 17 being a side view of the compartment. Disposed within the distribution panel are a circuit interrupter 1 movable between a disconnected position and a connected position and an interrupter compartment door (not shown) on an operating side or a front side of the interrupter compartment for being opened and closed upon the insertion/withdrawing of the circuit interrupter 1 or upon the shifting movement between the disconnected position and the connected position.

In the figures, the reference numeral 1 is the circuit interrupter, 2 is a floor portion of the circuit interrupter 1, 3 is an interlock pin of the circuit interrupter 1 and 4 is a withdrawal lever of the circuit interrupter 1. The interlock pin 3 is a pin for preventing an erroneous operation of the insertion/withdrawal of the circuit interrupter 1 as well as for preventing the jumping out of the circuit interrupter of the interrupter compartment upon the occurrence of the internal fault. The insertion/withdrawal operation of the circuit interrupter 1 in the above-described structure has been carried out by pulling the withdrawal lever 4 while the interlock pin 3 is being held by hand in the lifted position after the circuit interrupter compartment door disposed at the front side of the interrupter compartment or the interrupter compartment floor of the unillustrated distribution panel is opened.

In the conventional insertion/withdrawal mechanism of the circuit interrupter, it was required that the insertion of the circuit interrupter is carried out in the state where the front door of the distribution panel is opened and that the connection position (completion of the insertion) is confirmed by the angle of tilt of the withdrawal lever, so that the time needed for the insertion was long and the time needed for the personnel for confirming the connection position was changed from person to person.

Also, since the experienced and skilled personnel are decreasing these days, there was a demand for the development of a switchgear which can be driven even by a layman without the need for accessing to the charged live portion into the connected position or the disconnected position with the front door of the distribution panel kept closed.

SUMMARY OF THE INVENTION

Accordingly, the chief object of the present invention is to provide an insertion/withdrawal mechanism for a circuit interrupter in which the personal difference in time needed for the insertion/withdrawal of the interrupter is eliminated and which is simple in operation and structure.

Also, another object of the present invention is to provide an insertion/withdrawal mechanism for a circuit interrupter which allows the insertion/withdrawal of the circuit interrupter even when the front door is closed.

With the above objects in view, the present invention resides in an insertion/withdrawal mechanism for a circuit interrupter including an interrupter mounted to a floor section of an interrupter compartment and movable between a disconnected position and a connected position within the interrupter compartment and an interrupter moving device for moving the circuit interrupter between the disconnected position and the connected position. The interrupter moving device comprises a drive shaft operable by an external operating means from outside of the interrupter compartment, a lever connected between the drive shaft and the circuit interrupter for driving the circuit interrupter between the disconnected position and the connected position, and a motion translating device connected between the drive shaft and the circuit interrupter for translating a rotary motion of the drive shaft into a linear motion of the circuit interrupter between the disconnected position and the connected position.

The lever may be rotatable between a disconnecting position corresponding to the disconnected position of the interrupter and a connecting position corresponding to the connected position of the interrupter, the disconnected and connected positions being at substantially diametrically opposed positions about a center of rotation of the lever.

The lever may be permitted to take an over centered position to which the lever can be rotated from the connecting position to the disconnecting position and beyond the disconnected position by a predetermined distance so that the interrupter cannot return to the connected position by a pushing force accidentally applied to the interrupter.

The lever may be in slidable engagement with a guide means disposed to the interrupter for a guiding engagement with the lever.

The interrupter moving means may also comprise handle insertion port opening/closing means that allows an operating handle to be inserted therethrough and operably connected to the drive shaft and that is accessible from the outside with an interrupter compartment doors in a closed position.

The motion translating device may comprise a shutter device for permitting or preventing the insertion and connection of the external operating handle with respect to the drive shaft and an insertion port disabling means for disabling the opening motion of the shutter device when the interrupter compartment door is opened.

The insertion/withdrawal mechanism may further comprise an open/close detector device associated at one end with the shutter device for being moved toward an on/off indicator of the interrupter as the shutter device moves toward the open position, the on/off state detector device engaging the open/close indicator to prevent the shutter device from moving toward the open position when the interrupter is opened.

The insertion/withdrawal mechanism may further comprise an interrupter compartment door locking means for locking the interrupter compartment door into the closed state when the interrupter is in the connected position.

The insertion/withdrawal mechanism may further comprise an earthing switch disabling means which disables the operation of an earthing switch in relation to the movement of the shutter device toward its open position and which disables the operation of an earthing switch in relation to the movement of the interrupter compartment door toward its closed position.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

FIGS. 1 to 15 inclusive illustrate a circuit interrupter insertion/withdrawal mechanism of the present invention. In these figures, the same reference numerals as those appeared in FIGS. 16 and 17 designate identical or corresponding components and their explanation will be omitted.

Figure 1:
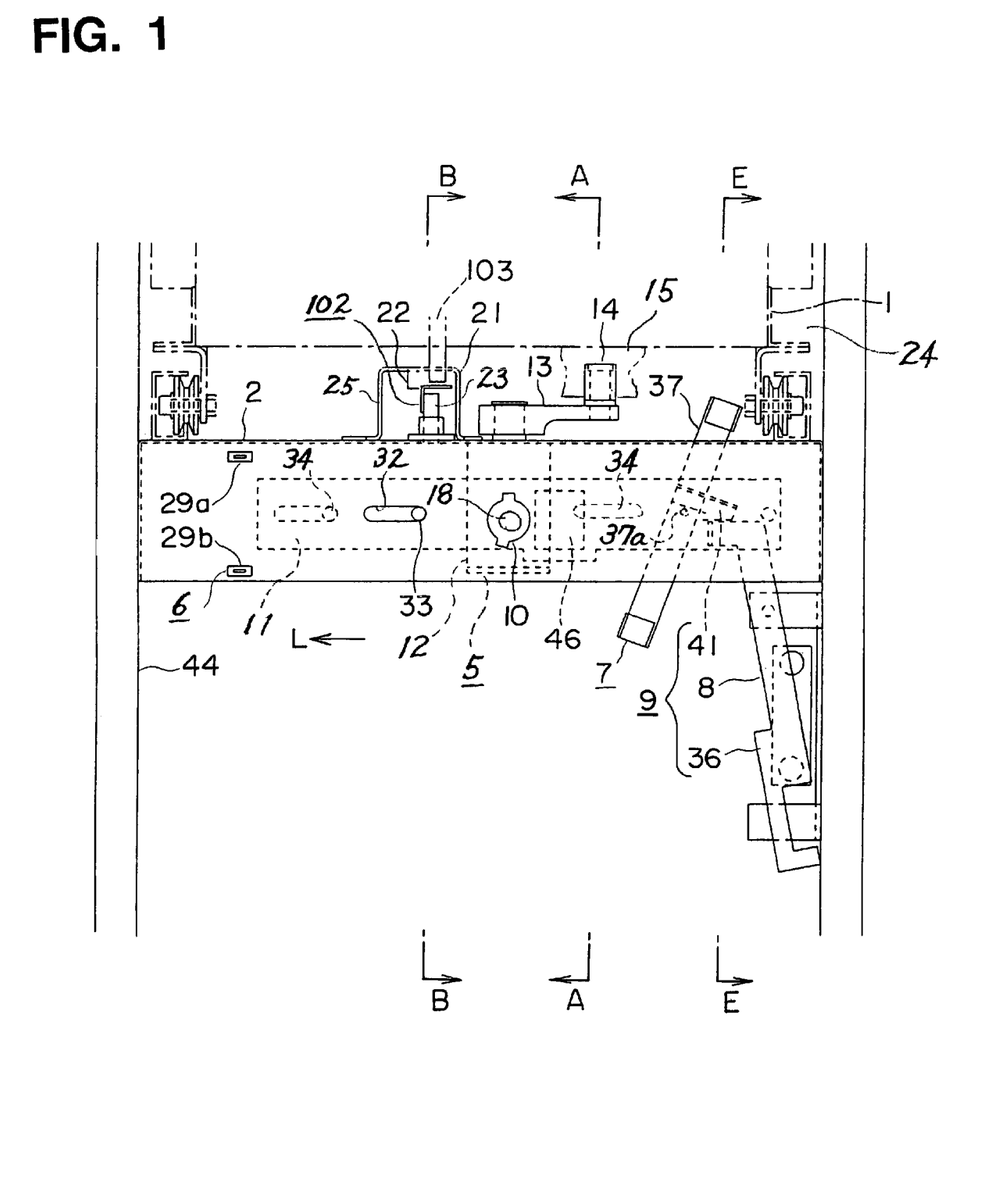
FIG. 1 is a schematic fragmental front view of a circuit interrupter insertion/withdrawal mechanism of one embodiment of the present invention.
Figure 2:
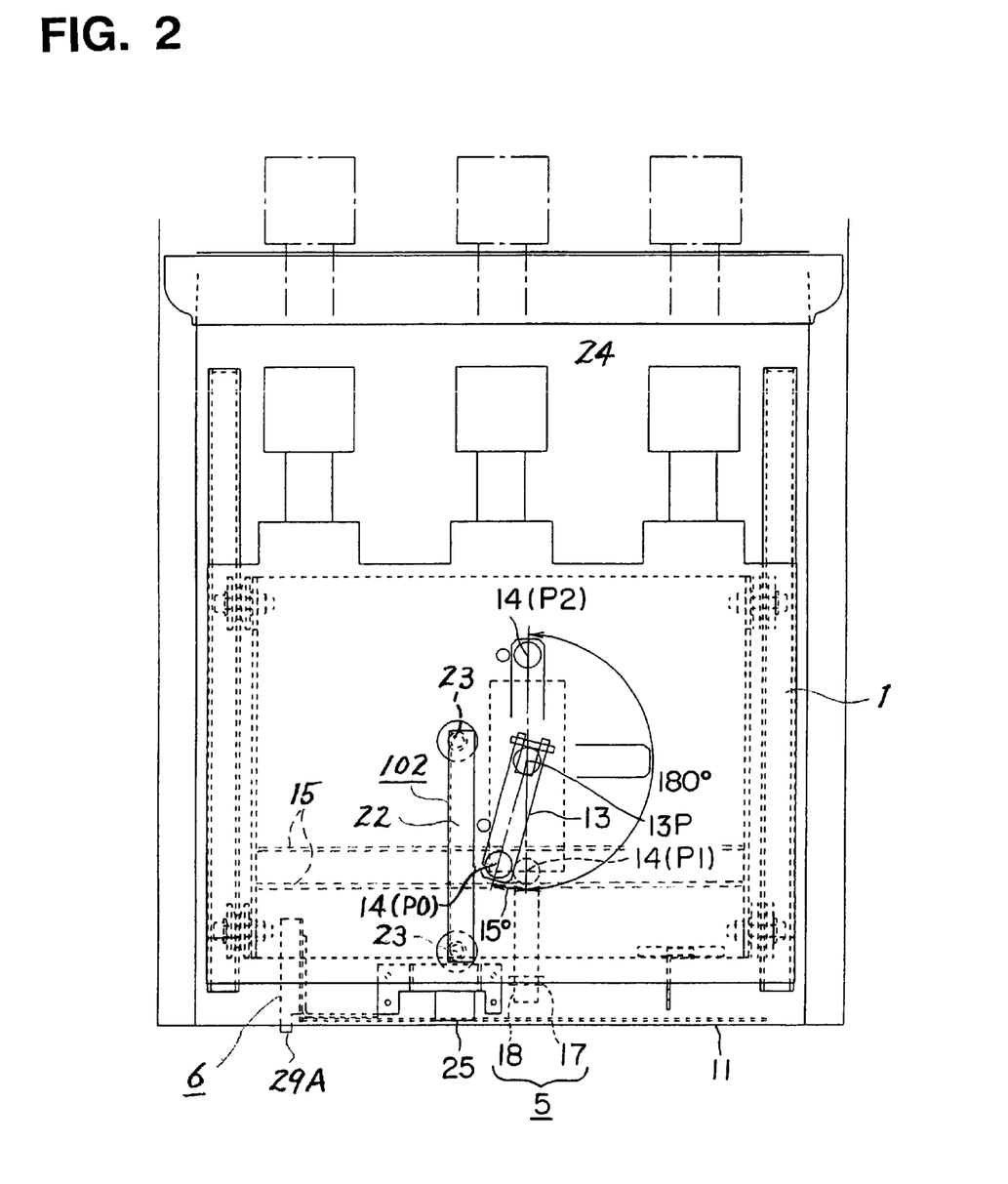
FIG. 2 is a schematic plan view of the circuit interrupter insertion/withdrawal mechanism of the present invention.
Figure 3:
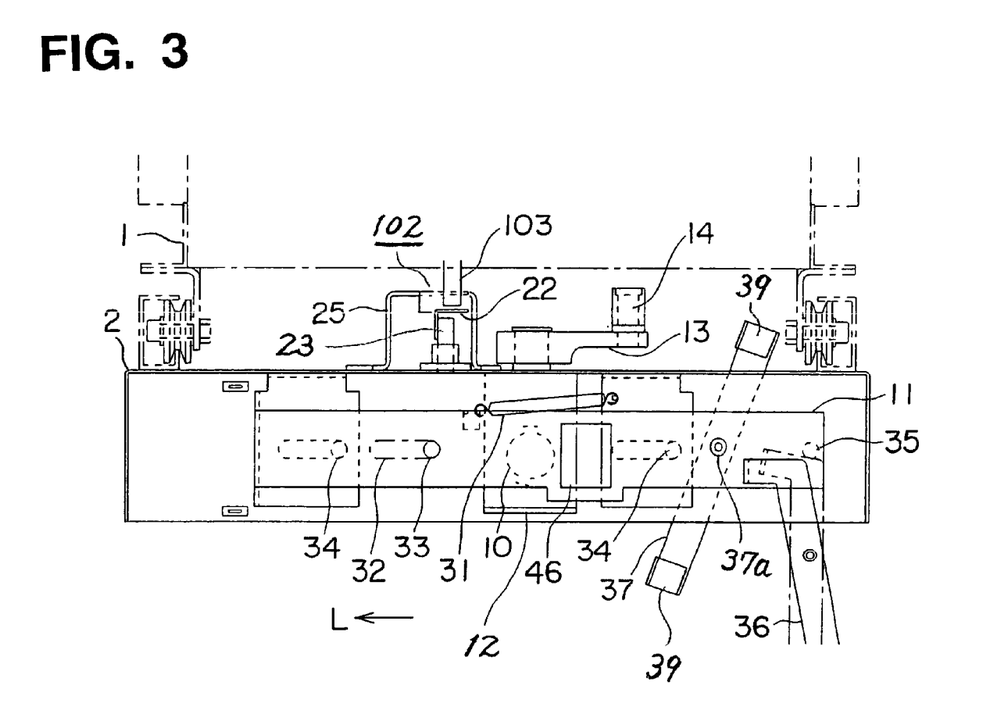
FIG. 3 is a schematic fragmental front view showing the shutter of the insertion/withdrawal mechanism shown in FIG. 1.
Figure 4:
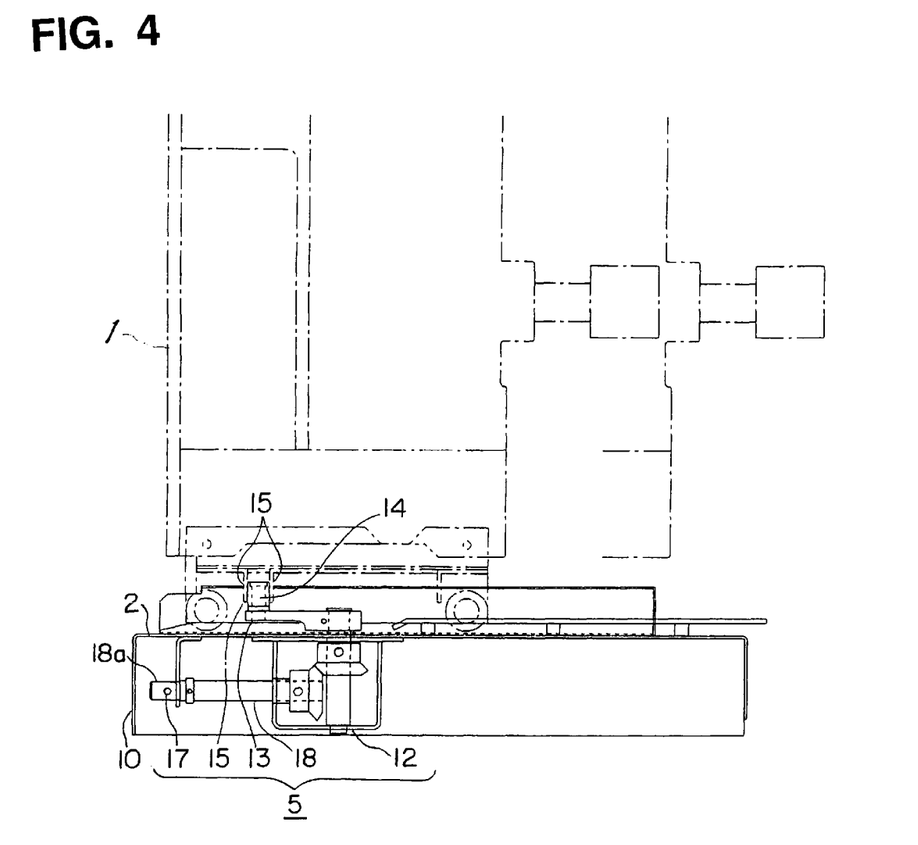
FIG. 4 is a sectional side view taken along line A—A of FIG. 1.

Referring first to FIGS. 1 to 4, FIG. 4 is a schematic fragmental front view of a circuit interrupter insertion/withdrawal mechanism of one embodiment of the present invention, FIG. 2 is a schematic plan view of the circuit interrupter insertion/withdrawal mechanism of the present invention, FIG. 3 is a schematic fragmental front view showing the shutter of the insertion/withdrawal mechanism shown in FIG. 1, and FIG. 4 is a sectional side view taken along line A—A of FIG. 1.

In FIG. 1, the reference numeral 10 is an insertion port as a connection portion formed in the front end face of a floor section 2 of an interrupter compartment 24. Through this insertion port 10, a shaft 19a of the handle 19 or an external operating means as shown in FIGS. 8 and 9 can be inserted to extend therethrough and connected to an end portion 18a (FIG. 4) of a gear shaft 18 or a drive shaft of a circuit interrupter moving device 5.

The insertion port 10 is closed by a shutter 11 or an insertion port opening/closing means which will be described later when the handle 19 which is the external operating means is not connected to the gear shaft 18 or the drive shaft constituting the circuit interrupter moving means 5.

Figure 8A:
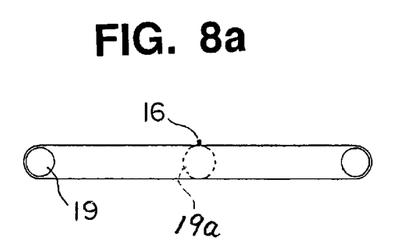
FIG. 8a is a front view of the handle or the external operating means in a position when the circuit interrupter is in the disconnected position.
Figure 8B:
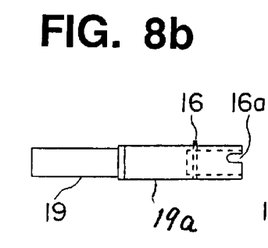
FIG. 8b is a side view of the handle or the external operating means in a position when the circuit interrupter is in the disconnected position.
Figure 8C:
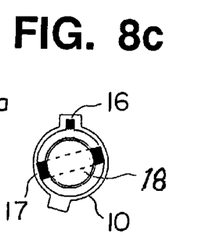
FIG. 8c is a sectional explanatory view of the handle or the external operating means in engagement with the drive shaft of the mechanism when the circuit interrupter is in the disconnected position.
Figure 9A:
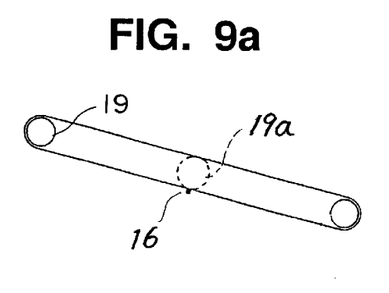
FIG. 9a is a front view of the handle or the external operating means in a position when the circuit interrupter is in the connected position.
Figures 9B, 9C:
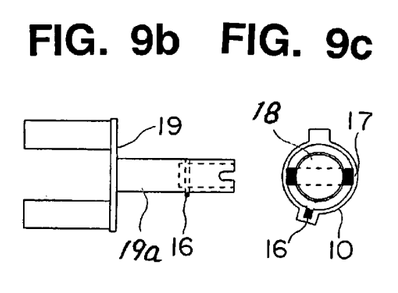
FIG. 9b is a side view of the handle or the external operating means in a position when the circuit interrupter is in the connected position.
FIG. 9c is a sectional explanatory view of the handle or the external operating means in engagement with the drive shaft of the mechanism when the circuit interrupter is in the connected position.

FIGS. 8 and 9 illustrate the handle 19 or the external operating means in positions when the circuit interrupter 1 is in the disconnected and connected positions, respectively, and FIG. 8a is a front view of the handle 19, FIG. 8b is a side view of the handle 19, FIG. 8c is a sectional explanatory view of the handle 19 in engagement with the drive shaft 18 of the mechanism, FIG. 9a is a front view of the handle 19, FIG. 9b is a side view of the handle 19 and FIG. 9c is a sectional explanatory view of the handle 19 in engagement with the drive shaft 18 of the mechanism.

The illustrated external operating means is the handle 19 that has the shaft 19a detachably connectable to the end portion 18a of the gear shaft 18 of the interrupter moving device.

The insertion port 10 has a key hole shape for allowing the passage of a pull-out preventing pin 16 secured to the shaft 19a of the handle 19 while preventing the pulling out of the handle 19 during its rotation for operating the interrupter moving device. The handle 19 has notches 16a at the end portion thereof for engaging engagement pins 17 attached at the end portion of the drive shaft 18.

FIGS. 8a, 8b and 8c illustrate the position of the handle 19 and angular positions of the pins 16 and 17 when the interrupter 1 is in the disconnected position, and FIGS. 9a, 9b and 9c illustrate the position of the handle 19 and the angular positions of the pins 16 and 17 when the handle 19 is rotated by 195 degrees in the clockwise direction and the interrupter 1 is brought into the connected position.

In FIG. 4, the interrupter moving operating device 5 comprises the gear shaft 18 or the drive shaft having one end accessible through the insertion port 10 and being capable of being connected by the shaft 19a of the handle 19 which is the external operating means, a gear box 12 in which the rotation in a vertical plane of the gear shaft 18 is translated into the rotation in a horizontal plane and a lever 13 connected to the gear box 12 for the rotation at the bottom of the circuit interrupter 1 for inserting or withdrawing the interrupter 1 according to the direction of rotation of the gear shaft 18.

The lever 13 is provided at its end with a roller 14 rotatable about a vertical axis and this roller 14 is slidably and rotatably received between two parallel guide rails 15 attached to the bottom of the interrupter 1 to extend in the width direction of the interrupter 1, whereby the interrupter 1 is driven between a disconnected position shown in a dot-and-dash line on the left in FIG. 4 and a connected position shown in a dash line on the right in FIG. 4 by a swing motion of the lever 13.

The drive force transmitting means between the gear shaft 18 and the lever 13 is a gear box 12, which in this example is a couple of helical gears arranged to drive the circuit interrupter 1 between the disconnected position and the connected position.

Figure 10A:
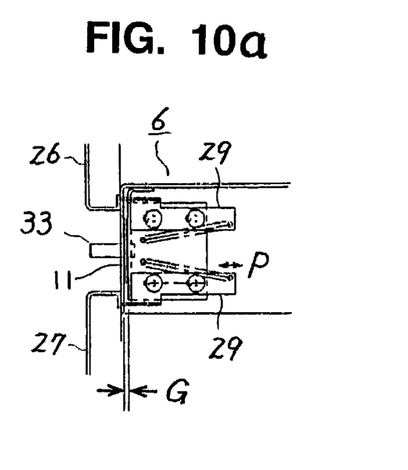
FIG. 10a is a fragmental sectional side view showing the interrupter compartment locking means when the interrupter compartment doors are closed.
Figure 10B:
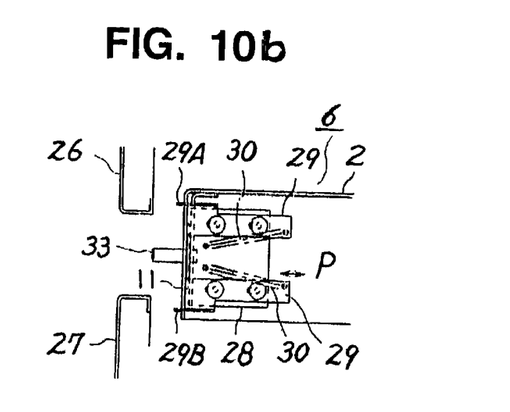
FIG. 10b is a fragmental sectional side view showing the interrupter compartment locking means when the interrupter compartment doors are opened.

In FIGS. 1 to 4, the circuit interrupter 1 is in the disconnected position, in which the insertion port 10 of an earthing switch disabling means 9 of the interrupter 1 which will be described later is not closed by the shutter 11 and is opened. The interrupter compartment upper door 26 and the lower door 27 of the distribution panel are closed as shown in FIG. 10a. FIG. 10b illustrates the interrupter compartment doors 26 and 27 at their open positions.

When it is desire to move the circuit interrupter 1 from the disconnected position to the connected position, an operating pin 33 attached to the shutter 11 (shown in FIGS. 1, 3, 5 and 10) and extending through an elongated hole 32 in the front wall of the interrupter compartment floor 2 is moved in the direction of an arrow L (to the left in the FIG. 1). Then, the shutter 11 is moved to its open position against the spring action of the return spring 31 to move an operating window 46 to align with the insertion port 10, thereby opening the inserting port 10 and permitting the access to the gear shaft 18 through the inserting port 10.

Then, the handle 19 or the external operating means can now be inserted and connected through the insertion port 10 to the gear shaft 18 of the interrupter moving operating means 5. When the handle 19 is rotated by 195 degree, for example, then the gear shaft 18 is rotated and its rotation is transmitted to the lever 13 through the gear box 12 to rotate the lever 13 about the rotation center 13P by 195 degrees in the counter clockwise direction. This rotation causes the interrupter 1 to be driven from the disconnected position to the connected position.

As shown in FIG. 2, the center of rotation 13P of the lever 13 is positioned between the actual disconnected position and the connected position of the interrupter 1.

The roller 14 which is disposed at the engaging end of the lever 13 engaging the circuit interrupter 1 can take a disconnected position P1, a connected position P2 and over centered disconnected position P0. The disconnected position P1 is the position of the roller 14 when the circuit interrupter 1 is at the disconnected position (solid line in FIG. 2) and the connected position P2 is the position of the roller 14 when the circuit interrupter 1 is at the connected position (dashed line in FIG. 2). The over centered disconnected position P0 is the position of the roller 14 when the circuit interrupter 1 is still positioned at the disconnected position (solid line in FIG. 2) but the roller 14 is moved in front (as viewed in the counter clockwise) of the disconnected position P1 which is at the diametrically opposite position to the final connected position P2 by an angle of 15 degrees or so.

In other words, before the circuit interrupter 1 is actually moved from its disconnected position to the connected position, the handle 19 or the lever 13 must be rotated from the over tuned disconnected position P0 to disconnected position P1 by a predetermined angle, which is 15 degrees in the embodiment. Thus, the circuit interrupter 1 is maintained in the disconnected position and cannot be moved to the connected position by an accidental pushing force urging the interrupter 1 to the connected position and until the lever 13 of the circuit interrupter moving operation means 5 was correctly operated by the handle 19.

When the handle 19 is pulled out from the insertion port 10 after the circuit interrupter 1 is brought into the connected position, the shutter 11 is moved to the right in FIG. 3 to be returned to its home position by a spring 31 shown in this figure to close the insertion port 10.

When the circuit interrupter 1 is to be withdrawn from the connected position to the disconnected position, the above procedure is carried out in the reverse order. That is, as the lever 13 is moved by the handle 19 so that its roller 14 is moved from the connected position P2 to the disconnected position P1, the circuit interrupter 1 is driven from the connected position (dashed lines in FIG. 2) to the disconnected position (solid lines in FIG. 2). By a further rotation of the lever 13 beyond the position P1 to the overcentered disconnected position P0 (that is, after the roller 14 of the lever 13 is moved along the substantially semicircular travel path P2–P1–P0=180°+15°=195°), the circuit interrupter 1 is maintained in the disconnected position and cannot be moved to the connected position by an accidental pushing force urging the interrupter 1 to the connected position. The lever 13 must be correctly operated by the handle 19 by operating the circuit interrupter moving operation means as set forth before.

It is seen in this embodiment that a stopper plate 25 for preventing the interrupter from jumping out of the compartment is disposed on the floor section 2 of the interrupter compartment 24.

Figure 5:
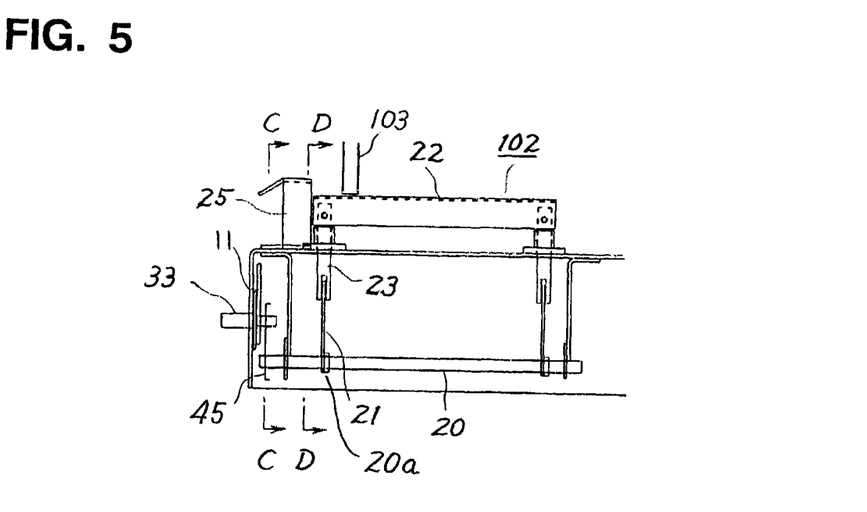
FIG. 5 is a sectional side view taken along line B—B of FIG. 1.
Figure 6:
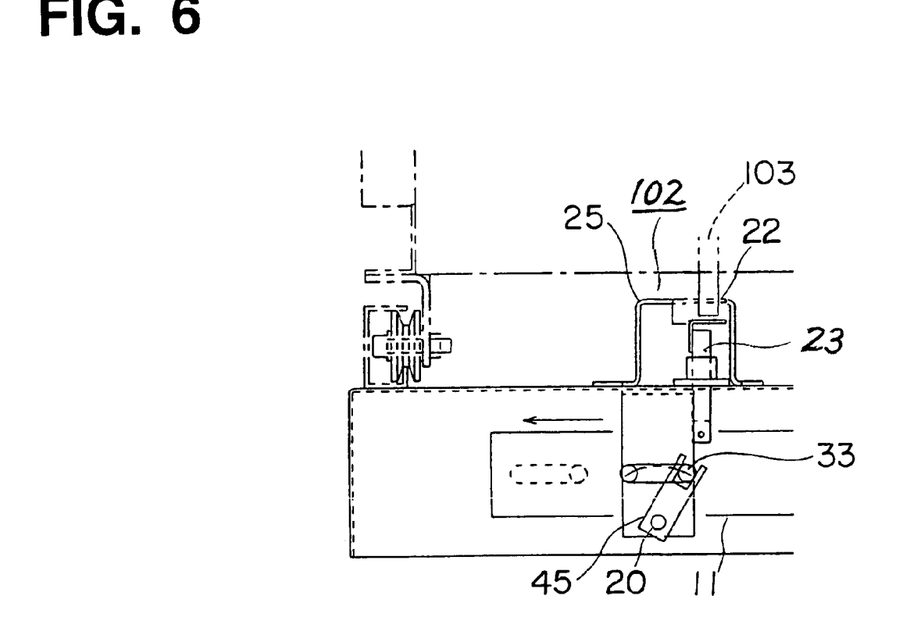
FIG. 6 is a sectional side view taken along line C—C of FIG. 5.
Figure 7:
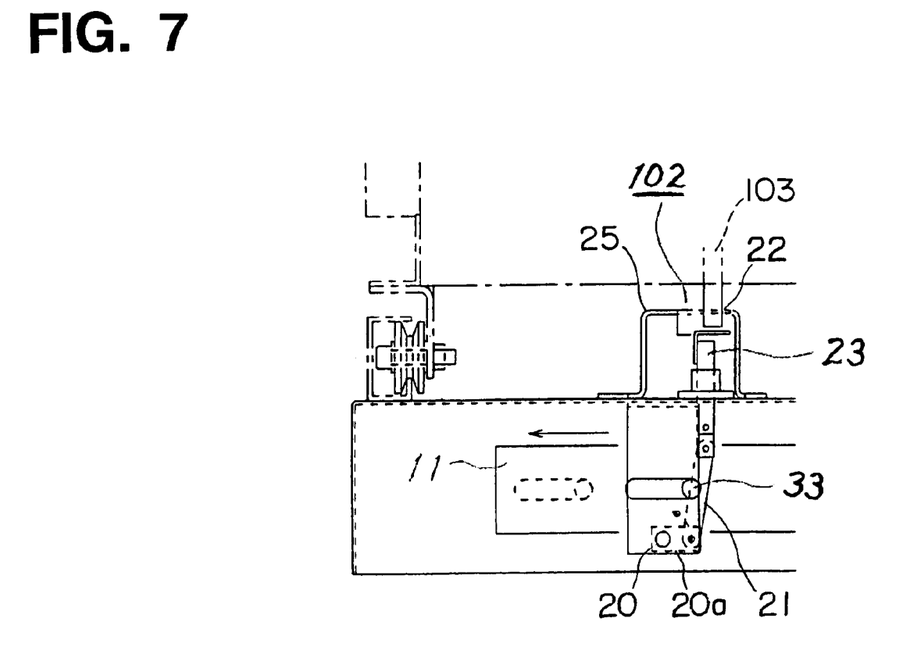
FIG. 7 is a sectional side view taken along line D—D of FIG. 5.

FIGS. 5 to 7 illustrate a on/off state detector device 102 for detecting the open and close state of the circuit interrupter 1, i.e., whether the circuit interrupter 1 is closed (ON) or opened (OFF). FIG. 5 is a sectional side view taken along line B—B of FIG. 1, FIG. 6 is a sectional side view taken along line C—C of FIG. 5 and FIG. 7 is a sectional side view taken along line D—D of FIG. 5.

The on/off state detector device 102 comprises a linkage composed of a shaft 20 rotatable relative to the floor section 2, short links 20a secured to the shaft 20, links 21 pivotally connected between the links 20a and pusher pins 23 axially slidably mounted to the floor section 2 and having attached thereto frame 22. On the other hand, the shaft 20 is also provided with a lever 45 secured thereto which engages at its forked end with the operating pin 33 attached to the shutter 11. The frame 22 attached to the pusher pins 23 of the on/off state detector device 102 is positioned below an on/off indicator or an on/off state indicator pin 103 of the circuit interrupter 1 so that position of the on/off indicator 103 can be detected. When the circuit interrupter 1 is on and the on/off indicator 103 is in its projected or lowered position, the frame 22 of the on/off state detector device 102 abuts the pin 103 as shown in FIGS. 5, 6 and 7 and is prevented from making the further upward movement beyond the illustrated position.

When the operating pin 33 is moved to the left in FIGS. 6 and 7 to open the shutter 11, the shaft 20 is rotated through the lever 45 shown in FIGS. 5 and 6. This movement also causes the short links 20a to rotate counterclockwise in FIG. 7 to push the pusher pins 23 and the frame 22 attached thereto upwardly through the links 21. When the circuit interrupter 1 is in the on position, the frame 22 abuts against the lowered on/off state indicator pin 103 projected from the circuit interrupter 1 at the position shown in FIGS. 5, 6 and 7. Since the further upward movement of the frame 22 of the on/off state detector device 102 is prevented the further leftward movement of the operating pin 22 is also prevented, whereby the shutter 11 is maintained at its closed position in which the insertion port 10 of FIG. 1 is kept closed. When the circuit interrupter 1 is in the off position, the state indicator pin 103 is in the retracted position where it does not prevent the upward movement of the frame 22 of the on/off state detector device 102, so that the shutter 11 can be moved fully leftward in the figures for allowing the handle 19 to be inserted into the insertion port 10 to initiate the interrupter withdrawing operation.

Figure 12:
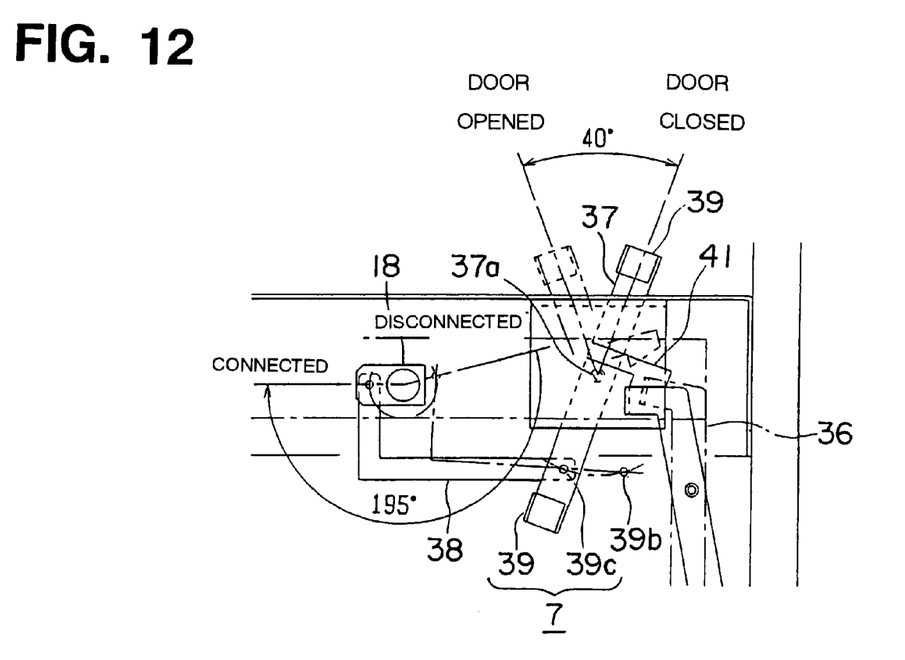
FIG. 12 is a schematic fragmental view showing the interrupter compartment door locking means and the earthing switch disabling means.
Figure 13:
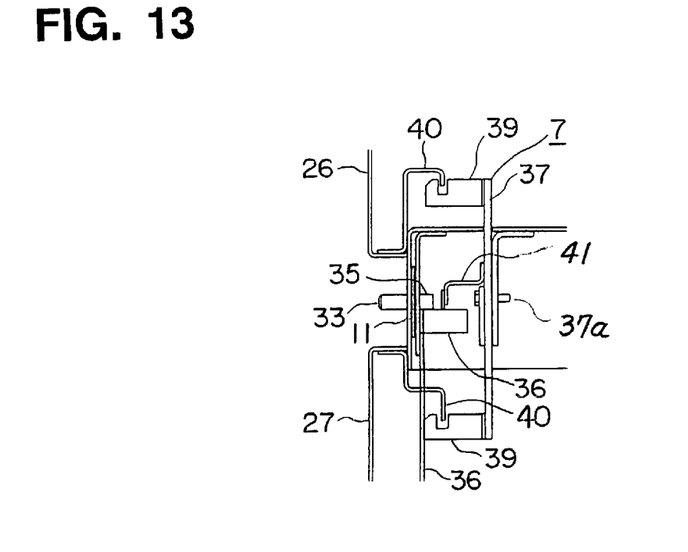
FIG. 13 is a fragmental side view of FIG. 12.

In FIGS. 12 and 13, when the handle 19 which is the external operating means shown in FIGS. 8 and 9 is connected to the gear shaft 18 or the drive shaft and rotated in the clockwise direction in FIG. 12 to the connected position of the interrupter 1, a locking lever 37 is rotated clockwise about a pin 37a through a link 38 connected to a short arm 18b secured to the drive shaft 18. Then as shown in FIG. 13 the locking lever 37 engages at it engaging pieces 39 with receiving pieces 40 of the interrupter compartment doors 26 and 27 to lock the doors 26 and 27 in the closed positions.

On the other hand, when the handle 19 connected to the gear shaft 18 is rotated in the counterclockwise direction in FIG. 12 to the disconnected position of the interrupter 1, the link 38 causes the locking lever 37 to rotated about the pin 37a counterclockwise direction to put the engaging pieces 39 of the locking lever 37 out of engagement with the receiving pieces 40 of the interrupter compartment doors 26 and 27 to allow the doors 26 and 27 to open.

Figure 11:
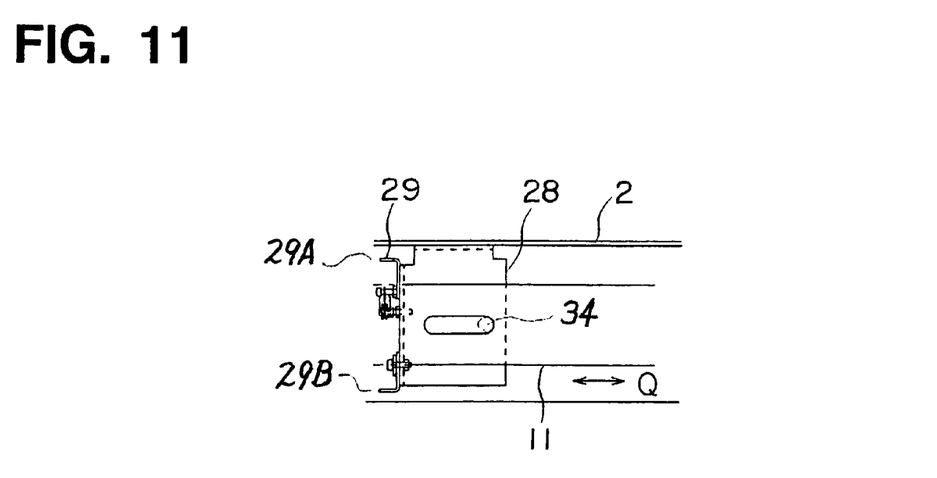
FIG. 11 is a fragmental front view showing the interlocking mechanism for the shutter and the interrupter compartment door locking means.

FIGS. 10a, 10b and 11 illustrate insertion port opening/closing means disabling means 6 for disabling the movement of the shutter 1 or the insertion port opening/closing means. FIG. 10a is a fragmental sectional side view showing the interrupter compartment disabling means 6 when the interrupter compartment doors 26 and 27 are closed, and FIG. 10b is a fragmental sectional side view showing the interrupter compartment disabling means 6 when the interrupter compartment doors 26 and 27 are opened. FIG. 11 is a fragmental front view showing the interlocking mechanism for the shutter 11 and the interrupter compartment door locking means 6.

The insertion port opening/closing disabling means 6 prevents the shutter 11 from moving from the position closing the insertion port 10 when the interrupter compartment doors 26 and 27 are opened, and this disabling means 6 permits the shutter 11 to move to the left in FIG. 11 to open the insertion port 10 when the interrupter compartment doors 26 and 27 are closed.

In FIGS. 10a, 10b and 11, the insertion port opening/closing port disabling means 6 comprises an interlocking frame 29 slidably mounted to a support frame 28 by means of pins and elongated holes engaging to the pins. The support frame 28 is secured to the floor section 2 of the interrupter compartment 24 and the interlocking frame 29 is biased by tension springs 30 to the position shown in FIG. 10b, in which front edge of the interlocking frame 29 abuts against the rear surface of the front wall of the interrupter compartment floor section 2 while the tip portions 29A and 29B are forwardly projecting through the front wall of the interrupter compartment floor section 20 when both of the interrupter compartment doors 26 and 27 are opened.

When at least of the interrupter compartment doors 26 and 27 is in the closed position as shown in FIG. 10a, at least one of the tip portions 29A and 29B is pushed by the doors 26 or 27 to move in the left in the figure the interlock frame 29 against the action of the spring 30. In this position a gap G corresponding to the thickness of the shutter 11 is formed between the inner surface of the front wall of the floor section 2 and the front edge of the interlocking frame 29 so that the gap G allows the shutter 11 to be moved thereinto until it reaches to the closing position in which it closes the insertion port 10.

Referring now to FIGS. 1 and 3, the shutter 11 which is the insertion port opening/closing means will now be described. The shutter 11 is a plate-like member disposed at the back side of the front wall of the floor section 2 of the interrupter compartment 24 and is horizontally slidable along the front wall of the floor section 2. The shutter is urged toward the right in the figures by the return springs 31 to the closed position, preventing the handle 19 from being inserted into the insertion port 10 and being connected to the drive shaft 18, but when it is moved to the open position against the actions of the springs 30, the opening window 46 formed in the shutter 11 is coincide with the insertion port 10 formed in the floor section 2 and allows the drive shaft 18 to be operated by the handle 19 (FIGS. 8 and 9).

The shutter 11 has four pins secured thereto, the first one being the operating pin 33 for manually moving the shutter 11 as previously described, the second ones being two support pins or guide pins 34 for supporting and guiding the shutter 11 for the horizontal sliding movement as previously explained. The fourth pin is an interlock pin 35 disposed at the right end (as viewed in the figures) of the shutter 11. The interlock pin 35 locks an ES shutter 36 for an earthing switch 101 (FIG. 14) for opening and closing the earthing switch (ES) insertion port 51 which is a receptacle into which an earthing switch operating handle (ES handle) for operating the earthing switch 101 of the circuit interrupter 1 is inserted. The ES switch 101 is a switch for grounding the main circuit to make it at a ground potential.

Figure 14:
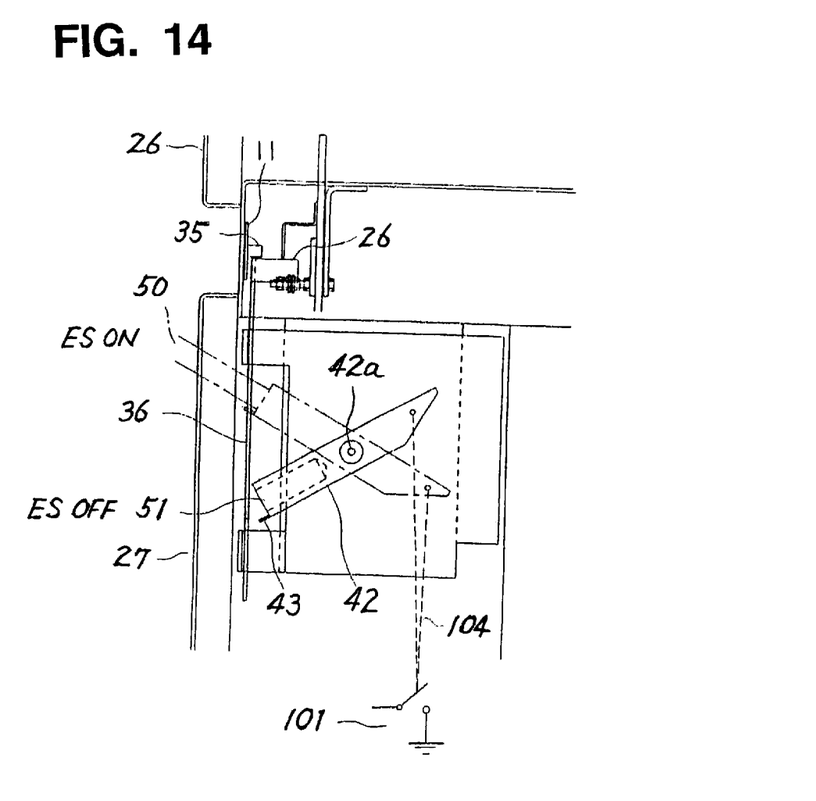
FIG. 14 is a fragmental sectional view taken along line E—E of FIG. 1.
Figure 15:
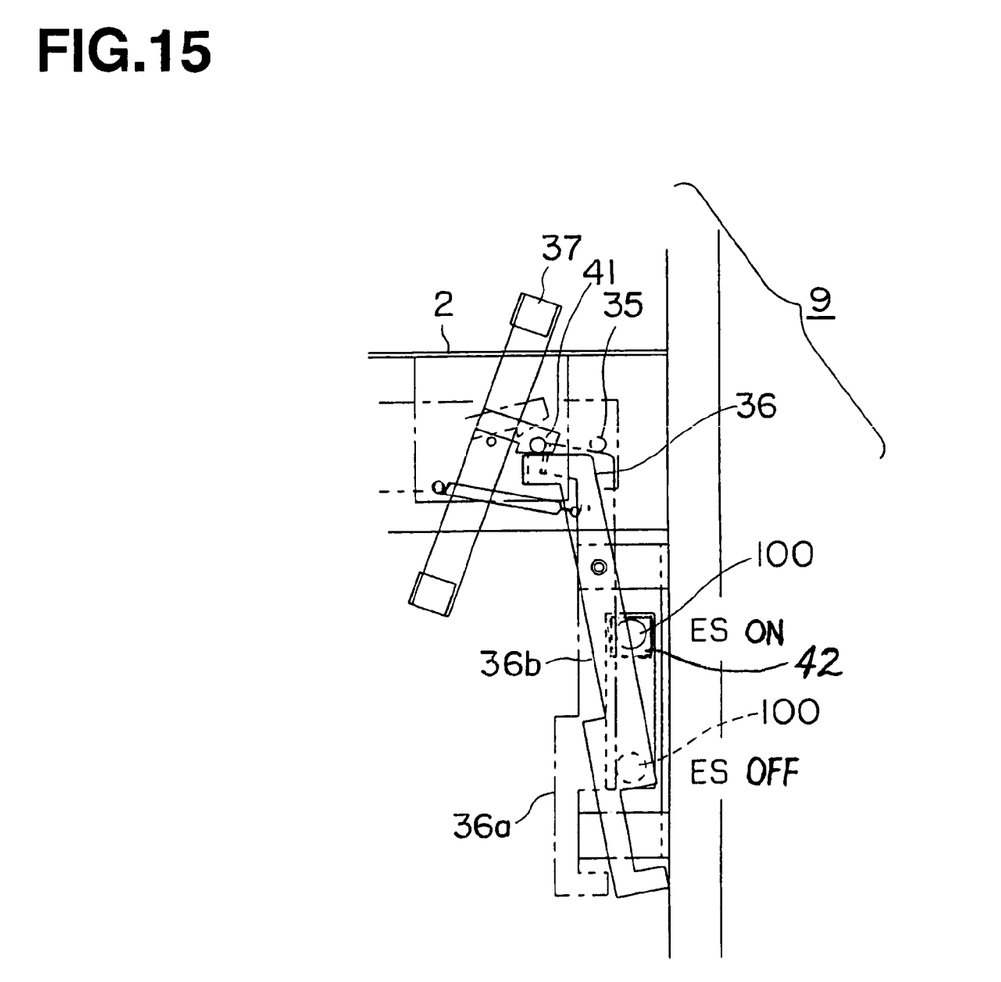
FIG. 15 is a fragmental front view of FIG. 14.

The description will now be made as to the earthing switch 101 and an earthing switch disabling means 9 in conjunction with FIGS. 1, 3 and 12 to 15. FIGS. 13 and 14 are side views showing the ES shutter 36 for opening and closing the insertion port 51 for receiving the ES handle 50 (FIG. 14) for the switching operation of the earthing switch 101, and FIG. 15 is a front view of FIG. 14, the reference numeral 42 being a switch lever having an insertion port 51 for receiving the ES handle 50 therein and pivotable about a pin 42a.

The earthing switch disabling means 9 is operated in relation to the movement of the shutter 11 or the insertion port opening/closing means toward the open position to disable the operation of the earthing switch 101. The earthing switch disabling means 9 is also operated in relation to the closing movement of the interrupter compartment doors 26 and 27 by the interrupter compartment door locking means 7.

In FIGS. 1 and 3, when the operating pin 33 is manually moved to slide the shutter 11 to the left in the figure, the operating window 46 aligns the insertion port 10 so that the shaft of the handle 19 can be inserted therethrough to connect the driving shaft 18. At the same time, the movement of the shutter 11 causes the interlocking pin 35 for locking the ES shutter 36 to move to the left in the figure to lock the ES shutter 36 in the closed state.

In FIGS. 12 and 13, the gear shaft 18 of the circuit interrupter movement operating means 5 and the locking lever 37 are interlocked through the link 38. The locking lever 37 pivotably supported by the pin 37a at its center is provided at its both ends with an engagement piece 39, which engages and disengages against the receiving pieces 40 disposed to the interrupter compartment doors 26 and 27 according to the rotation of the locking lever 37. Attached to the locking lever 37 by a screw (not shown) is an earthing switch interlocking piece 41, which pushes the upper end of the ES shutter 36 downwardly to keep it in the closed state when the interrupter compartment doors 26 and 27 are in the locked states.

With the above arrangement, when the shutter 11 is returned to the right or the closed state, while the interlocking pin 35 is disabled, the earthing switch interlocking piece 41 maintaines the ES shutter 36 in the closed state.

In FIG. 14, the ES lever 42 has the ES insertion port 51 at one end so that it can be connected to the ES handle 50 and is connected at the other end to the ES main body 101 through the link 104. As shown in FIG. 15, when the ES lever 42 is operated to take the position shown in dot-and-dash lines (FIG. 14), the ES switch 101 turns on (ES ON) and when it is in the position shown solid lines (FIG. 14), the ES switch 101 turns off (ES OFF).

When the gear shaft 18 is rotated by the handle 19 (FIGS. 8 and 9) in the clockwise direction or in the interrupter inserting direction, the locking lever 37 of the interrupter compartment door locking means 7 is rotated clockwise by 40 degrees to lock the interrupter compartment doors 26 and 27 in the closed states. At this time, the interrupter 1 is moved by the interrupter moving operating means 5 from the disconnected position to the connected position, so that the interrupter compartment doors 26 and 27 cannot be opened.

On the other hand, the earthing switch interlocking piece 41 constituting the earthing switch disabling means 9 is operated to lock the ES shutter 36 in the closed position. That is, the ES shutter 36 is positioned as shown by the reference numeral 36b in FIG. 15 and the ES insertion port 51 is closed. In this example, since the arrangement is such that two insertion holes 100 in the plate-shaped connection portion member for allowing the access to the ES insertion port 51 are closed when the ES insertion port 51 is located at the predetermined position of ES on or ES off, the shaft of the ES handle 50 cannot be inserted into the ES insertion port 51 of the ES switch lever 42.

On the other hand, the circuit interrupter 1 cannot be inserted into the connected position from the disconnected position during the earthing switch is being closed. This is because, since the projection 43 disposed at the tip of the ES switch lever 42 prevents returning of the ES shutter 36 to the open position to disable the leftward (in the figure) movement of the interlocking pin 35, the shutter 11 which is the insertion port opening/closing means cannot be opened.

As has been described, according to the present invention, the insertion/withdrawal mechanism for a circuit interrupter including an interrupter mounted to a floor section of an interrupter compartment and movable between a disconnected position and a connected position within the interrupter compartment and an interrupter moving device for moving the circuit interrupter between the disconnected position and the connected position. The interrupter moving device comprises a drive shaft operable by an external operating means from outside of the interrupter compartment, a lever connected between the drive shaft and the circuit interrupter for driving the circuit interrupter between the disconnected position and the connected position, and a motion translating device connected between the drive shaft and the circuit interrupter for translating a rotary motion of the drive shaft into a linear motion of the circuit interrupter between the disconnected position and the connected position. Therefore, the insertion/withdrawal mechanism for a circuit interrupter can be operated with ease without depending upon the skill of the experienced operator in the insertion/withdrawal operation of the interrupter and the structure is simple. Also, the insertion/withdrawal mechanism can be operated even when the front door is closed.

What is claimed is:

1. An insertion and withdrawal mechanism for a circuit interrupter including an interrupter mounted to a floor section of an interrupter compartment and movable between a disconnected position and a connected position within said interrupter compartment, comprising:

an interrupter moving device for moving said circuit interrupter between said disconnected position and said connected position, said interrupter moving device comprising:

a drive shaft operable by an external operating means from outside of said interrupter compartment, a lever connected between said drive shaft and said circuit interrupter for driving said circuit interrupter between said disconnected position and said connected position, and a motion translating device connected between said drive shaft and said circuit interrupter for translating a rotary motion of said drive shaft into a linear motion of said circuit interrupter between said disconnected position and said connected position, wherein said lever is rotatable between a disconnecting position corresponding to said disconnected position of said interrupter and a connecting position corresponding to said connected position of said interrupter, said disconnected and connected positions being at substantially diametrically opposed positions about a center of rotation of said lever.

2. The insertion and withdrawal mechanism as claimed in claim 1, wherein said lever is permitted to take an over centered position to which said lever can be rotated from said connecting position to said disconnecting position and beyond said disconnected position by a predetermined distance so that said interrupter cannot return to the connected position by a pushing force accidentally applied to said interrupter.

3. The insertion and withdrawal mechanism as claimed in claim 1, wherein said lever is in slidable engagement with a guide means disposed to said interrupter for a guiding engagement with said lever.

4. A insertion and withdrawal mechanism for a circuit interrupter including an interrupter mounted to a floor section of an interrupter compartment and movable between a disconnected position and a connected position within said interrupter compartment, comprising:

an interrupter moving device for moving said circuit interrupter between said disconnected position and said connected position, said interrupter moving device comprising:

a drive shaft operable by an external operating means from outside of said interrupter compartment, a lever connected between said drive shaft and said circuit interrupter for driving said circuit interrupter between said disconnected position and said connected position, and a motion translating device connected between said drive shaft and said circuit interrupter for translating a rotary motion of said drive shaft into a linear motion of said circuit interrupter between said disconnected position and said connected position, wherein said interrupter moving means comprises handle insertion port opening and closing means that allows an operating handle to be inserted therethrough and operably connected to said drive shaft and that is accessible from the outside with interrupter compartment doors in a closed position.

5. The insertion and withdrawal mechanism as claimed in claim 4, further comprising an interrupter compartment door locking means for locking one of said interrupter compartment doors into a closed state when said interrupter is in the connected position.

6. The insertion and withdrawal mechanism as claimed in claim 5, further comprising an earthing switch disabling means which disables an operation of an earthing switch in relation to a movement of a shutter device toward an open position and which disables the operation of an earthing switch in relation to the movement of one of said interrupter compartment doors towards a closed position.

7. A insertion and withdrawal mechanism for a circuit interrupter including an interrupter mounted to a floor section of an interrupter compartment and movable between a disconnected position and a connected position within said interrupter compartment, comprising:

an interrupter moving device for moving said circuit interrupter between said disconnected position and said connected position, said interrupter moving device comprising:

a drive shaft operable by an external operating means from outside of said interrupter compartment, a lever connected between said drive shaft and said circuit interrupter for driving said circuit interrupter between said disconnected position and said connected position, and a motion translating device connected between said drive shaft and said circuit interrupter for translating a rotary motion of said drive shaft into a linear motion of said circuit interrupter between said disconnected position and said connected position, wherein said motion translating device comprises a shutter device for permitting or preventing the insertion and connection of an external operating handle with respect to said drive shaft and an insertion port disabling means for disabling an opening motion of said shutter device when an interrupter compartment door is opened.

8. The insertion and withdrawal mechanism as claimed in claim 7, further comprising an on and off state detector device associated at one end with said shutter device for being moved toward an on and off indicator of said interrupter as said shutter device moves toward the open position, said on and off state detector device engaging said on and off indicator to prevent said shutter device from moving toward the open position when said interrupter is opened.

* * * * *